United States Patent [19]

Kato

[11] Patent Number: 5,353,090
[45] Date of Patent: Oct. 4, 1994

[54] CAMERA

[75] Inventor: Shigeru Kato, Tachikawa, Japan

[73] Assignee: Olympus Optical Co., Ltd., Tokyo, Japan

[21] Appl. No.: 151,828

[22] Filed: Nov. 15, 1993

[30] Foreign Application Priority Data

Nov. 17, 1992 [JP] Japan ................................ 4-306943

[51] Int. Cl.⁵ ...................... G03B 13/02; G01C 3/04
[52] U.S. Cl. ................................................... 354/403
[58] Field of Search ............................ 354/403; 356/8

[56] References Cited

U.S. PATENT DOCUMENTS 4,257,704  3/1981  Yokota ...................................... 356/8

FOREIGN PATENT DOCUMENTS 57-64217  4/1982  Japan .
63-88834  6/1988  Japan .

Primary Examiner—W. B. Perkey
Attorney, Agent, or Firm—Cushman, Darby & Cushman

[57] ABSTRACT

A camera includes a finder optical system having an objective optical system and an eyepiece optical system, independent of a photographic optical system, and a range measuring optical system. A path splitting member Is disposed in the optical path of the objective optical system to make an optical axis of incident light introduced from the objective optical system into the eyepiece optical system coincide with an optical axis of the range measuring optical system, and satisfies conditions:

$$650 \text{ nm} \leq \lambda(R_0) \leq 850 \text{ nm}$$

$$R_0 = [R(550 \text{ nm}) + R(900 \text{ nm})]/2$$

where $\lambda(R_0)$ is the wavelength at which the reflectance of the path splitting member regarding an axial ray changes to $R_0$, and $R(550 \text{ nm})$ and $R(900 \text{ nm})$ are the reflectances of the path splitting member where the wavelengths of axial rays are 550 nm and 900 nm, respectively.

4 Claims, 5 Drawing Sheets

CAMERA

BACKGROUND OF THE INVENTION

1. Field of the Invention

This invention relates to a camera having a finder optical system disposed independent of a photographic optical system, and in particular, to an active autofocusing type rangefinder camera which projects a beam of light coming from a light source, through a part of the finder optical system, on an object and receives the light beam reflected from the object, thereby measuring automatically an object distance to drive a lens to a focused point.

2. Description of the Related Art

Range measuring devices used in compact cameras make use of an infrared projecting, active autofocusing type trigonometrical range finding technique. This technique is such that Infrared light emitted from an infrared-emitting diode (which is hereinafter abbreviated to IRED) is projected through a projection lens on an object, and reflected light from the object Is received, through a light-receiving lens, by a semiconductor position sensor device (which is hereinafter abbreviated to PSD) disposed at the distance of a base length from the projection lens so that the object distance is measured in accordance with the position of incidence of the light. Since the projection lens is usually provided independence of the finder optical system, parallax is produced between tile optical axes of the projection lens and the finder. Consequently, a focus frame indicative of a range measuring area in the finder and the actual position of spot light caused by the projection lens may vary with the object distance.

An arrangement for obviating such inconvenience is set forth, for example, in Japanese Patent Preliminary Publication No. Sho 57-64217. This arrangement is made so that one optical path on the object side is divided by a path splitting member into two, one taken as a projection lens system and the other as a finder optical system, and the optical axis of emergence of the projection lens system is made to coincide with that of incidence of the finder optical system for parallax correction.

If, as the path splitting member, a wavelength selective mirror is used which transmits infrared Light and reflects visible light to reduce the loss of the amount of light, the characteristic of wavelength after the optical path has been split will change with the angle of incidence of a ray of light because the path splitting surface of the wavelength selective mirror is constructed with a multilayer thin film.

Since in general the finder optical system has a wide angle of view, the angle of incidence of light on the path splitting surface also changes in a wide range. Hence, where the light split by the wavelength selective mirror is viewed through the finder, the wavelength characteristic varies with the position of a finder picture, namely the angle of incidence of light on the wavelength selective mirror, with the resultant problem of causing coloring to an image.

SUMMARY OF THE INVENTION

It is, therefore, an object of the present invention to provide a camera which is free of parallax between the finder optical system and the projection tens system and can bring about a sharp finder image.

The camera according to the present invention includes a finder optical system having an objective optical system and an eyepiece optical system, independent of a photographic optical system, and a range measuring optical system. The camera is designed so that a path splitting member is disposed in the optical path of the objective optical system of the finder optical system to make the optical axis of Incident light introduced from the objective optical system into the eyepiece optical system coincide with that of the range measuring optical system, and satisfies conditions:

$$650 \text{ nm} \leq \lambda(R_0) \leq 850 \text{ nm} \quad (1)$$

$$R_0 = [R(550 \text{ nm}) + R(900 \text{ nm})]/2 \quad (2)$$

where $\lambda(R_0)$ is the wavelength at which the reflectance of the path splitting member regarding an axial ray becomes $R_0$, and $R(550 \text{ nm})$ and $R(900 \text{ nm})$ are the reflectances of the path splitting member where the wavelengths of axial rays are 550 nm and 900 nm, respectively.

This and other objects as well as the feature and advantages of the present invention will become apparent from the following detailed description of the preferred embodiments when taken In conjunction with the accompanying drawings.

DETAILED DESCRIPTION OF THE PREFERRED EMBODIMENT

Figure 1A:
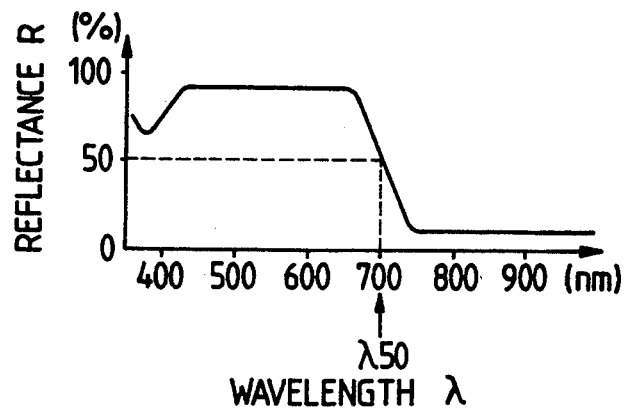
FIGS. 1A, 1B, and 1C are views for explaining one example of the dependence of a wavelength selective mirror on the angle of incidence which shows reflectance-wavelength characteristics, in the camera according to the present invention.
Figure 1A:
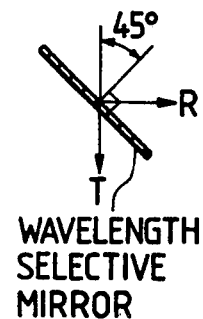
Figure 1B:
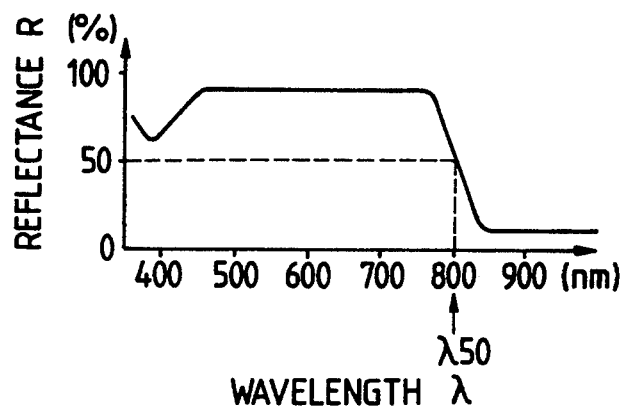
Figure 1B:
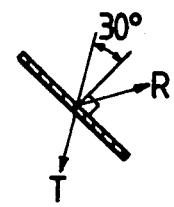
Figure 1C:
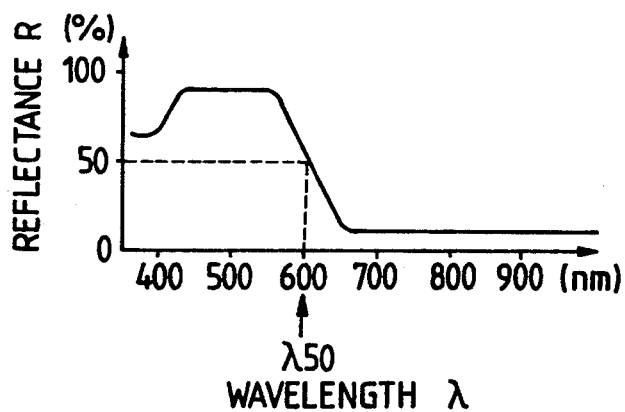
Figure 1C:
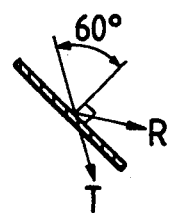

In accordance with FIGS. 1A, 1B, and 1C, before undertaking the explanation of the embodiment of the present invention, it will be expedient to describe the relationship between the wavelength of light incident on a multilayer thin film constituting the path splitting surface of the wavelength selective mirror and the angle of incidence thereof.

In FIG. 1A, when the angle of incidence is 45°, a reflectance R is high (a transmittance T is low) in the visible region, while in the infrared region, the reflectance R is lower (the transmittance is higher). The path splitting surface having such characteristics, as shown in FIGS. 1B and 1C, is such that when the angle of incidence changes, a wavelength $\lambda(R_0)$ showing a wide variation of reflectance also changes. Specifically, when the angle of incidence is smaller than 45°, the reflectance R is constant in the visible region, but becomes higher (the transmittance T is lower) in the infrared region (refer to FIG. 1B), whereas in the case of the angle of incidence larger than 45°, it becomes inconstant in the visible region (refer to FIG. 1C).

Thus, in the camera using the path splitting member with the characteristics mentioned above, when the angle of incidence of light on the path splitting member is smaller than 45°, the reflectance becomes higher in the infrared region. Consequently, the brightness of projection by the IRED becomes insufficient, and the accuracy of range measurement may be degraded. Further, in the case of the angle of incidence greater than 45°, coloration unnecessary for reflected light is produced at the path splitting surface, with the result that a sharp finder image is not brought about.

Figure 2:
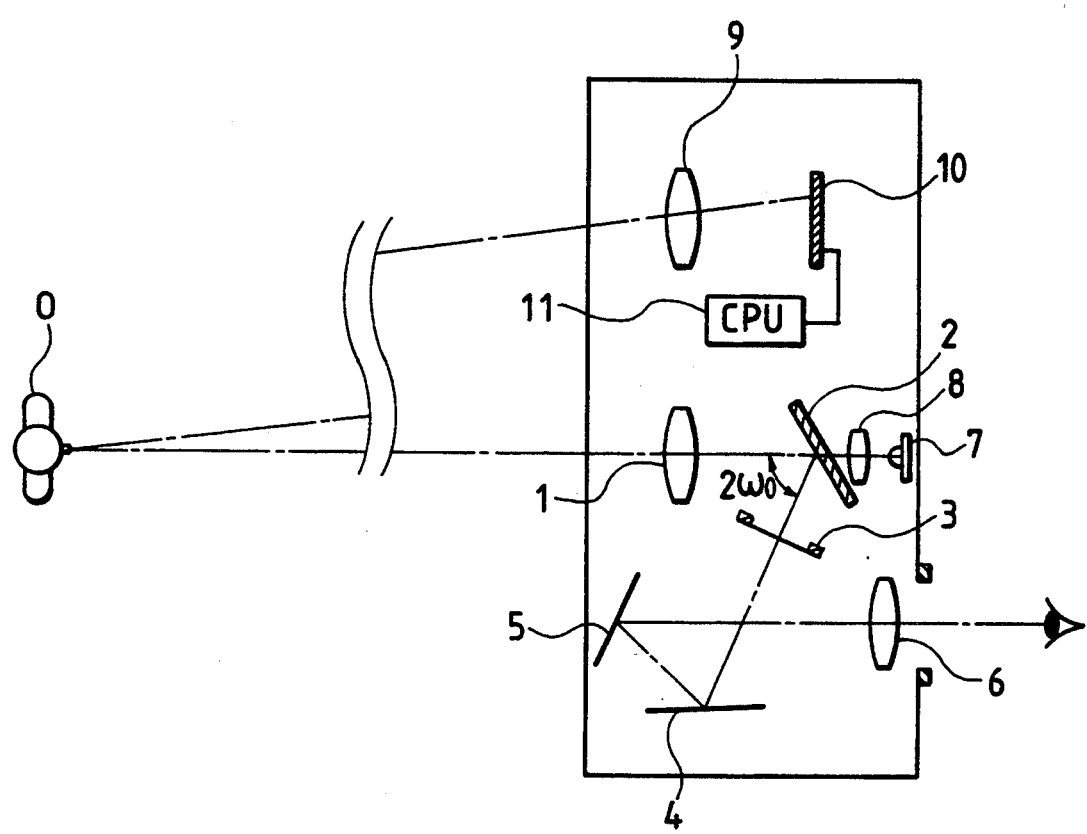
FIG. 2 is a view showing the arrangement of one embodiment of the camera according to the present invention.

FIG. 2 shows one embodiment of the present invention. In this figure, reference numeral 1 denotes an objective lens also used as a projection lens; 2 a wavelength selective mirror whose path splitting surface is configured with thin films; 3 a field frame; 4 and 5, reflecting mirrors for erecting an image; and 6 an eyepiece. These components constitute a finder optical system. Reference numeral 7 represents an IRED; 8 a condenser lens for collecting infrared light emitted from the IRED 7; 9 a light-receiving lens for receiving the infrared light reflected from an object O; 10 a PCD; and 11 a CPU for calculating the distance from the detecting signal of the PSD 10 to the object O. These components constitute a range measuring optical system.

In the finder optical system, for a ray of light from the object O which is incident on the objective lens 1, only visible light is reflected at the wavelength selective mirror 2 and forms an intermediate image in the vicinity of the field frame 3. The intermediate image is erected through the mirrors 4 and 5 and observed through the eyepiece 6. In the range measuring optical system, on the other hand, the infrared light originating from the IRED 7, after being collected by the condenser lens 8, is transmitted through the wavelength selective mirror 2, enters the objective lens 1, and is converted, by the objective lens 1, into parallel beams, which are projected on the object O. The infrared light reflected from the object O is imaged through the light-receiving lens 9 on the PSD 10, thereby allowing a signal corresponding to the imaging position to be output from the PSD 10 and the distance to the object O to be calculated at the CPU 11.

Figure 3:
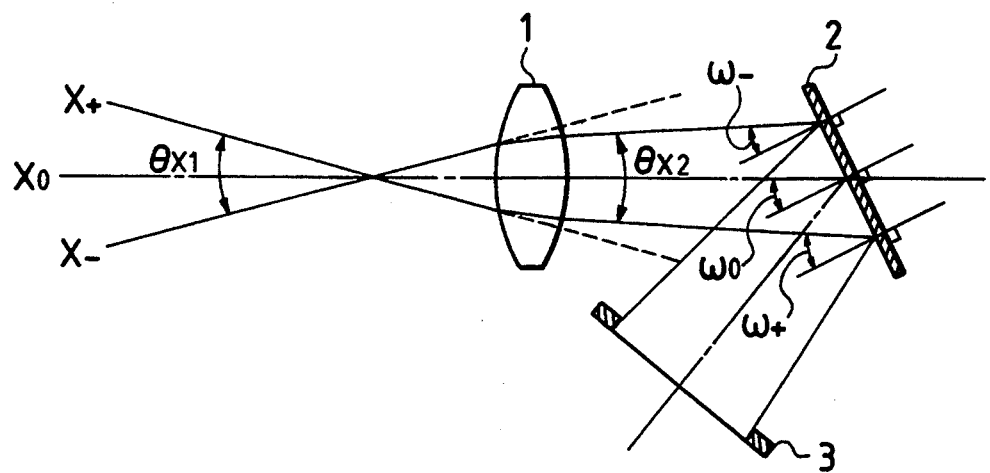
FIG. 3 is an enlarged view showing essential parts of a finder optical system in FIG. 2.

FIG. 3 shows an enlarged optical system ranging from the objective lens 1 to the field frame 3. In this diagram, an angle $(\theta_{Xn})$ made by principal rays $X_+$ and $X_-$ around the field of the finder optical system is as large as an angle $\theta_{X1}$ on the object side of the objective lens 1, but reduces to $\theta_{X2}$ on the eyepiece side. Hence, it is advantageous that the wavelength selective mirror 2 having the wavelength characteristics relative to the angle of incidence is situated behind the objective lens 1, rather than in front thereof, because the difference between angles of incidence $\omega$ becomes smaller.

Figure 4:
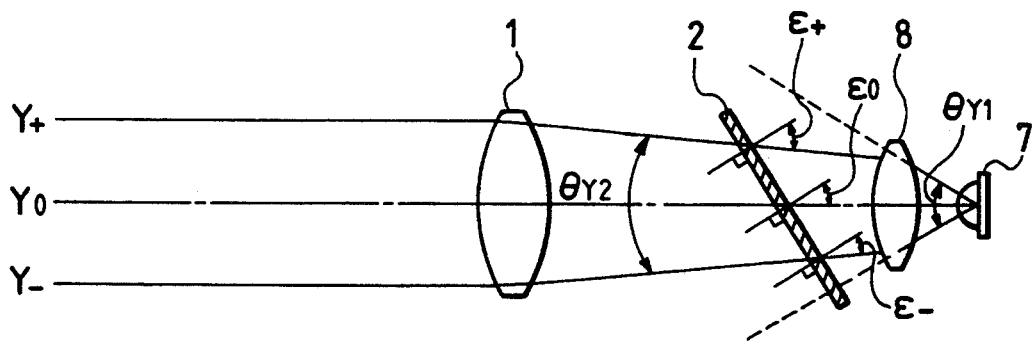
FIG. 4 is an enlarged view showing a projection section of a range measuring optical system in FIG. 2.

FIG. 4 depicts an enlarged optical system ranging from the objective lens 1 to the IRED 7. In this figure, an angle $(\theta_{Yn})$ made by maximum ray heights $Y_+$ and $Y_-$ of projection beams for range measurement is as wide as an angle $\theta_{Y1}$ in front of the IRED 7. With this angle, angles of incidence $\epsilon$ of light on the wavelength selective mirror 2 vary very greatly due to the ray heights. In this case, if the angle $\theta_{Y1}$ increases, the angles of incidence $\epsilon$ will also increase, and as mentioned above, the transmittance of part of light becomes low. Consequently, the intensity of infrared light projected on the object O is reduced and the accuracy of range measurement is degraded. In the embodiment, however, the condenser lens 8 with a positive refracting power is disposed between the wavelength selective mirror 2 and the IRED 7. This reduces the angle $\theta_{Y1}$ to an angle $\theta_{Y2}$ and at the same time, diminishes the difference between the angles of incidence $\epsilon$ at the entrance surface of the wavelength selective mirror 2.

Returning to FIG. 3, a comparison is now made between the angles of incidence $\omega$ at the wavelength selective mirror 2 for an axial ray $X_0$ of the finder optical system and the principal rays $X_+$ and $X_-$ around the field thereof. In the conventional finder optical system, it is common practice to take an angle of incidence $\omega_0$ of the axial ray $X_0$ as 45°. In this case, however, since an angle of incidence $\omega_+$ of the principal ray $X_+$ is more than 45°, this portion is characteristic of reflection shown in FIG. 1C and the resultant finder image on the side of the principal ray $X_+$ will be colored. As such, the angle of incidence $\omega_0$ of the axial ray $X_0$ is made smaller than 45° and the angle of incidence $\omega_+$ of the principal ray $X_+$ is approximated to 45°, thereby eliminating the coloration of the finder image.

Hence, when $\lambda(R_0)$ is the wavelength at which the reflectance of the path splitting member regarding an axial ray becomes RO, and R(550 nm) and R(900 nm) are the reflectances of the path splitting member where the wavelengths of axial rays are 550 nm (the medium wavelength of a visible ray) and 900 nm (the general wavelength of tile IRED), respectively, it is desirable that the characteristics and setting angle of the wavelength selective mirror are determined so that the wavelength $\lambda(R_0)$ showing a wide variation of the reflectance of the axial ray $X_0$ is set as in Condition (2) and satisfies Condition (1).

If the lower limit, 650nm (a longer wavelength of the visible ray), of Condition (1) is exceeded, the finder image becomes hard to view because of its coloring. Beyond the upper limit of Condition (1), there is high possibility that the transmittance with the wavelength emitted from the IRED is reduced. Consequently, infrared projection light for range measurement becomes taint and the accuracy of range measurement is deteriorated.

Figure 5A:
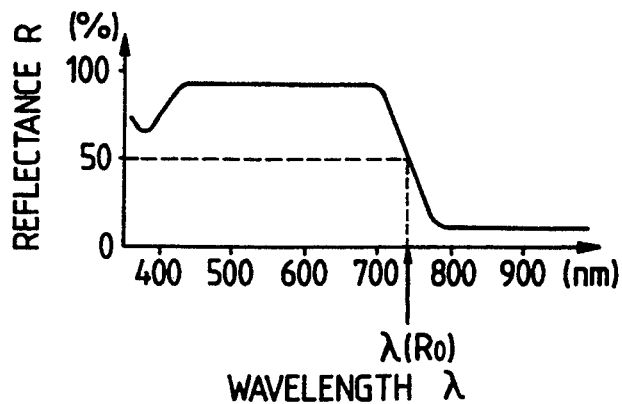
FIGS. 5A, 5B, and 5C are views for explaining another example of the dependence of the wavelength selective mirror on the angle of incidence which shows reflectance-wavelength characteristics.
Figure 5A:
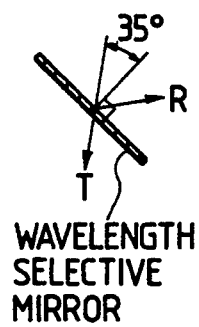
Figure 5B:
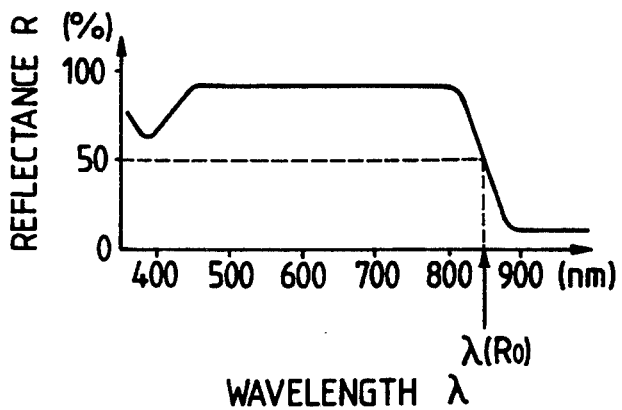
Figure 5B:
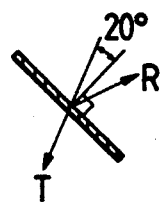
Figure 5C:
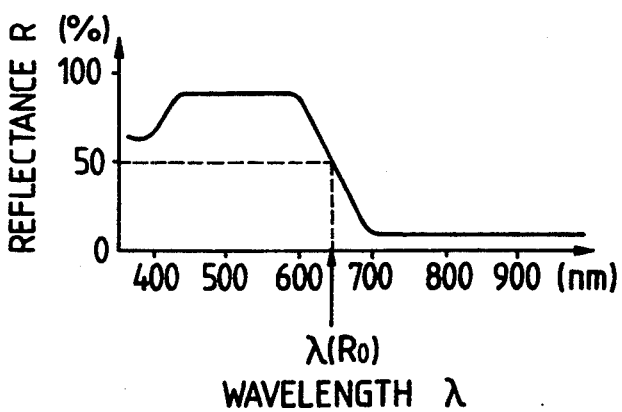
Figure 5C:
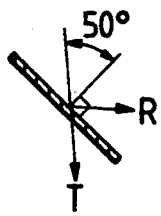

Referring now to FIGS. 5A, 5B, and 5C, the foregoing is explained. It is assumed that use is made of the path splitting member having the same characteristics as in FIGS. 1A, 1B, and 1C which show the path splitting surface composed of a multilayer thin film and the relationship between the wavelength of light incident on the thin film and the angle of incidence thereof. When the path splitting member is situated so that the angle of incidence of the optical axis entering the path splitting member is 45°, light at the angle of incidence of 60° is such that visible rays on the long-wavelength side are not reflected and coloration is caused. However, when the path splitting member is disposed in agreement with the above conditions so that the angle of incidence of the optical axis is smaller than 45°, the characteristics of reflection are as shown in FIGS. 5A, 5B, and 5C. As seen from FIG. 5C, nearly all the visible rays on line long-wavelength side are reflected and therefore, coloration is not caused. Further, as also seen from FIG. 5B, there is no effect on the neighborhood of 900 nm which is the general wavelength of the IRED and thus the accuracy of range measurement is not degraded.

Figure 6A:
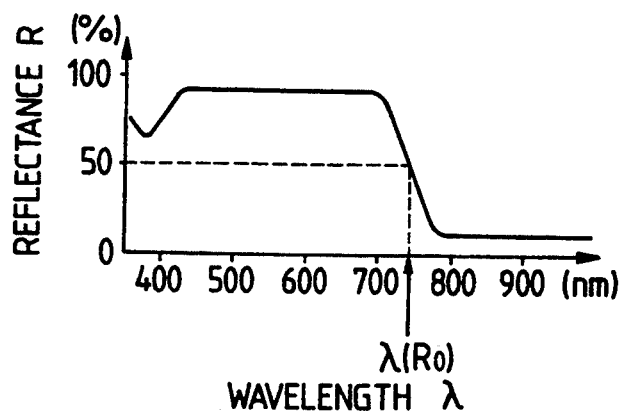
FIGS. 6A, 6B, and 6C are views for explaining still another example of the dependence of the wavelength selective mirror on the angle of incidence which shows reflectance-wavelength characteristics.
Figure 6A:
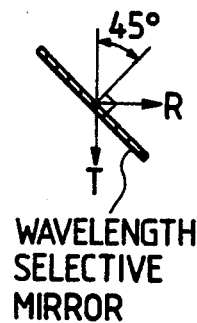
Figure 6B:
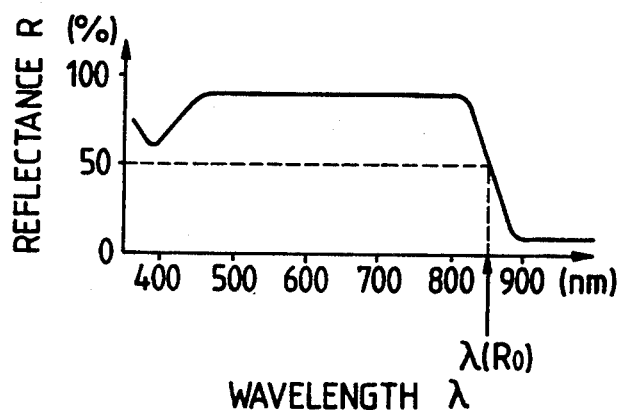
Figure 6B:
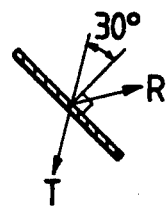
Figure 6C:
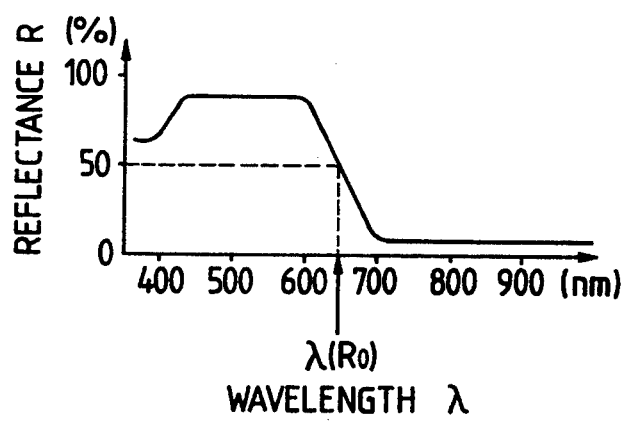
Figure 6C:
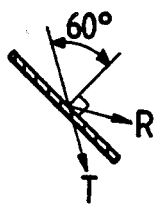

Alternatively, a path splitting surface is configured to have the characteristics of reflection shown in FIGS. 6A, 6B, and 6C and disposed in agreement with the above conditions. This placement also brings about the same effect.

What is claimed is:

1. A camera comprising:
   a finder optical system having an objective optical system and an eyepiece optical system, independent of a photographic optical system; and
   a range measuring optical system,
   wherein a path splitting member is disposed in an optical path of said objective optical system of said finder optical system to make an optical axis of incident light introduced from said objective optical system into said eyepiece optical system coincide with an optical axis of said range measuring optical system and satisfies conditions:

$$650 \text{ nm} \leq \lambda(R_0) \leq 850 \text{ nm}$$

$$R_0 = [R(550 \text{ nm}) + R(900 \text{ nm})]/2$$

where $\lambda(R_0)$ is a wavelength at which a reflectance of the path splitting member regarding an axial ray becomes $R_0$, and $R(550 \text{ nm})$ and $R(900 \text{ nm})$ are reflectances of the path splitting member where wavelengths of axial rays are 550 nm and 900 nm, respectively.

2. A camera according to claim 1, wherein said path splitting means is a wavelength selective mirror having a path splitting surface constructed of a multilayer thin film.

3. A camera according to claim 1, wherein a lens having a positive refracting power is disposed in front said path splitting member.

4. A camera according to claim 1, wherein a lens having a positive refracting power is disposed behind said path splitting member.

* * * * *